United States Patent [19]

Noll et al.

[11] Patent Number: 4,876,302

[45] Date of Patent: Oct. 24, 1989

[54] POLYURETHANE DISPERSIONS AND THE USE THEREOF AS FINISHING AGENTS

[75] Inventors: Klaus Noll, Cologne; Wilhelm Thoma, Leverkusen; Klaus Nachtkamp, Cologne; Walter Schröer, Leverkusen; Josef Pedain, Cologne, all of Fed. Rep. of Germany

[73] Assignee: Bayer Aktiengesellschaft, Leverkusen, Fed. Rep. of Germany

[21] Appl. No.: 284,970

[22] Filed: Dec. 15, 1988

Related U.S. Application Data

[63] Continuation of Ser. No. 54,650, May 27, 1987, abandoned, which is a continuation-in-part of Ser. No. 939,648, Dec. 9, 1986, abandoned, which is a continuation-in-part of Ser. No. 727,049, Apr. 25, 1985, abandoned.

[30] Foreign Application Priority Data

May 10, 1984 [DE] Fed. Rep. of Germany ....... 3417265

[51] Int. Cl.$^4$ ........................ C08K 5/54; C08K 5/06; C08L 75/04; C08L 75/12
[52] U.S. Cl. .................................. 524/267; 524/591; 524/375
[58] Field of Search ...................... 524/267, 591, 375

[56] References Cited

U.S. PATENT DOCUMENTS

| | | | |
|---|---|---|---|
| 3,262,805 | 7/1966 | Aoki | 117/11 |
| 4,017,493 | 4/1977 | Ferment et al. | 427/257 |
| 4,045,600 | 8/1977 | Williams | 427/379 |
| 4,203,883 | 5/1980 | Hangauer | 260/29.2 |
| 4,208,311 | 6/1980 | Kinoshita et al. | 260/29 |
| 4,237,264 | 12/1980 | Noll et al. | 528/67 |
| 4,306,998 | 12/1981 | Wenzel et al. | 260/13 |
| 4,408,008 | 10/1983 | Markusch | 524/591 |
| 4,594,385 | 6/1986 | Thoma et al. | 524/839 |

FOREIGN PATENT DOCUMENTS 3417265 5/1984 Fed. Rep. of Germany .
1191260 5/1970 United Kingdom .

*Primary Examiner*—C. Warren Ivy
*Attorney, Agent, or Firm*—Gene Harsh; Joseph C. Gil; Thomas W. Roy

[57] ABSTRACT

The present invention is directed to aqueous coating compositions suitable for use as coating and finishing agents for surface coatings, preferably PVC or polyurethane coatings, based on sedimentation-stable polyurethane dispersions having a solids content of about 10–70% by weight wherein the polyurethane-urea solids material is based on polyester diols, low molecular weight diols and optionally triols, chemically incorporated hydrophilic groups, specific mixtures of diisocyanates and polyamine chain extenders having an average functionality of greater than 2 and wherein the aqueous preparations additionally contain alkoxylated dimethyl-polysiloxanes and water-soluble polyethylene oxides. The present invention is also directed to a process for applying top coats and finishes to surface coatings, preferably PVC or polyurethane surface coatings, wherein the above-described aqueous coating and finishing agents are used as the top coat and the coatings are cured at about 70°–170° C.

15 Claims, No Drawings

POLYURETHANE DISPERSIONS AND THE USE THEREOF AS FINISHING AGENTS

CROSS-REFERENCE TO RELATED APPLICATION

This application is a continuation of application Ser. No. 054,650 filed May 27, 1987 (now abandoned).

The present application is a continuation-in-part of our copending U.S. Application Ser. No. 939,648, filed on Dec. 9, 1986 now abandoned which itself is a continuation-in-part of U.S. application Ser. No. 727,049, filed April 25, 1985, now abandoned.

BACKGROUND OF THE INVENTION

1. Field of the Invention

The present invention relates to aqueous polyurethane dispersion-based finishing agents and the use of these agents for the production of top coats or finishes on flexible substrates, preferably on PVC, having excellent adhesion and/or alcohol-resistance.

The present coating agents contain an aqueous polyurethane dispersion having specific chemical-physical properties and are characterized by a high urethane group content and by highly branched chain extension with (cyclo)aliphatic polyamines having a functionality of more than 2.

2. Description of the Prior Art

It is known in principle to produce polyurethane coatings on PVC. U.S. Pat. Nos. 3,262,805, 4,017,493 and 4,045,600, for example, describe processes for coating PVC using one-component or two-component polyurethane systems dissolved in organic solvents. However, the use of solvent-containing coating agents presents difficulties in practice: thus, it is necessary from both an economical and ecological point of view to restrict as far as possible or even to completely avoid the use of organic solvents.

DE-A 1,769,387 (GB-PS 1,191,260) describes a process for agglutinating PVC using aqueous polyurethane dispersions. The aqueous polyurethane dispersions could not however be used as a top coat or finish on PVC since it had been impossible to produce products which on the one hand had good adhesion to PVC (both in the dry and wet state) and on the other hand had the high quality level demand for top coats or finishes in the coating industry, i.e. high softening point, good mechanical strength, stability under hydrolysis aging, minimal swelling in plasticizers, blocking action against the migration of the plasticizers contained in the PVC, avoidance of coloring at the gelling temperatures of the PVC plastisols and pleasant, dry hand.

Only with the polyurethane urea dispersions disclosed in DE-OS 3,134,161 was it possible to produce coating agents for PVC which to a large extent met these demands. They are particularly suitable for use in the so-called reverse coating process in which the PUR top coat is initially produced on a separating material and then the main quantity of the coating is applied by using a foamed or unfoamed PVC plastisol or a similar PVC coating composition, into which coating the substrate is also slightly pressed. After hardening (such as by gelling the PVC plastisol), the ready-coated article is peeled off from the separating material and provides a PVC coating which has a PUR top coat.

However, these PUR dispersions are not very suitable for another economically-important field of use for polyurethane ureas, i.e. the subsequent finishing of substrate which is already provided with a PVC coating.

The application of ornamental or effect finishes in particular can only be carried out by subsequent finishing and very high demands are made such as high resistance to water/alcohol mixtures and good resistance to abrasion even in a wet state. However, these demands cannot be met by the subsequent application of the PUR dispersions according to DE-OS 3,134,161.

It has now been found that finishing agents for PVC may be obtained from aqueous polyurethane dispersions wherein the solids contain an extraordinarily high content of urethane groups due to the incorporation of large quantities of low molecular weight polyols. These agents meet the above requirements and are distinguishable by their excellent adhesion to PVC surface coatings both in a dry and wet state and furthermore their good resistance to ethyl alcohol, and more particularly to aqueous ethyl alcohol.

SUMMARY OF THE INVENTION

The present invention is directed to aqueous coating compositions for applying to surface coatings, preferably PVC or polyurethane coatings, based on sedimentation-stable polyurethane dispersions having a solids content of about 10 to 70% by weight, which are characterized in that the polyurethane-urea solids material contains (A) about 35 to 55% by weight of a polyester diol having a molecular weight of about 500 to 5000, preferably about 1000 to 3000, (b) About 6 to 15% by weight of low molecular weight diols and optionally triols having 2 to 10 carbon atoms, the quantity of triol being <8% by weight (C) about 1.5 to 15% by weight of anionic group containing and/or non-ionic polyoxyethylene segment-containing mono- or poly-functional compounds, (D) about 25 to 45% by weight of a diisocyanate corresponding to the general formula

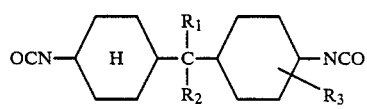

wherein $R_1$, $R_2$ and $R_3$ are the same or different and represent hydrogen or straight-chain or branched aliphatic hydrocarbon radicals having from 1 to 4 carbon atoms, preferably 4,4'-diisocyanatodicyclohexylmethane, (E) about 2 to 9% by weight of an aliphatic or cycloaliphatic diisocyanate other than (D) and (F) about 0.2 to 4.0% by weight of a polyamine having an average functionality greater than 2, preferably about 2.5 to 3.5, and the aqueous preparations contain alkoxylated di-methyl-polysiloxanes and water-soluble polyethylene oxides.

The present invention is also directed to a process for applying top coats and finishes to surface coatings, preferably PVC or polyurethane surface coatings, wherein the above-described aqueous coating compositions are used as the top coat and the coatings are cured at about 70°–170° C.

DETAILED DESCRIPTION OF THE INVENTION

It is surprising that in comparison with the teachings of DE-OS 3,134,161/EP 0,073,392, the present PUR dispersions which are applied as a finish to PVC surface coatings, adhere very well in the dry and wet state, and are distinguishable by good abrasion resistance to ethyl alcohol, more particularly aqueous ethyl alcohol. Furthermore, it is surprising that in spite of the addition of the hydrophilic agents, namely the alkoxylated dimethyl-polysiloxane and water-soluble polyethylene oxide-containing agents, the desired adhesion can also be obtained in the wet state.

The dispersions generally have a solids content of about 10 to 70% by weight, preferably about 15 to 65% by weight, and may be produced by various known processes. The solids material contains about 73–99%, by weight (I) about 65–99.8%, preferably of the polyurethane-ureas described in (A)-(F) above, (II) about 0.1–5%, preferably about 0.5–2%, by weight of alkoxylated dimethyl-polysiloxane and (III) about 0.1–10%, preferably about 0.5–5% by weight of water-soluble polyethylene oxide derivatives, wherein the sum of (I)+(II)+(III) is $\geq 80\%$ of the total solids present in the aqueous coating and finishing agents.

Processes for the production of stable aqueous polyurethane dispersions which are suitable according to the present invention are, for example, described in German Auslegeschriften 1,178,586 (U.S. Pat. No. 3,480,592), 1,495,745 (U.S. Pat. No. 3,479,310) and 1,770,068 (U.S. Pat. No. 3,756,992), German Offenlegungsschriften 2,314,512 (U.S. Pat. No. 3,905,929), 2,314,513 (U.S. Pat. Bo. 3,920,598), 2,320,719 (British Pat. No. 1,465,572), 2,446,440, 2,555,534 and 2,811,148 and by D. Dieterich in "Angewandte Chemie"82, 53 (1970). The general principle of these processes is directed to incorporating hydrophilic centers as so-called internal emulsifiers into the chain of a polyurethane or poly- urethane-urea macromolecule. In this content, anionic (e.g. $SO_3^\ominus$ or $COO^\ominus$) groups and/or repeating [—$CH_2$—$CH_2$—O—]] units may be used as hydrophilic centers. The hydrophilic centers may be incorporated into the macromolecule, at any point during the production of the polyurethane.

Usually a prepolymer having NCO groups is initially produced from a relatively high molecular weight polyhydroxyl compound, optionally a low molecular weight monoalcohol, diol and/or triol, and an excess of polyisocyanate. The prepolymer is then converted into a polyurethane dispersion with chain lengthening, for example in accordance with the processes described in DE-AS 1,495,745 (U.S. Pat. No. 3,479,310), DE-OS 1,770,068 (U.S. Pat. No. 3,756,992) or DE-OS No. 2,446,440 and DE-OS 2,811,148. Both the relatively high molecular weight polyhydroxyl compound and the low molecular weight alcohol which is optionally used may contain ionic groups or groups which are convertible into ionic groups as described in DE-OS No. 1,770,068 and DE-OS No. 2,446,440. However, it is also possible to incorporate monoalcohols or diols having ethylene oxide sequences into the macromolecule, in addition to or instead of the ionically-modified high and low molecular weight alcohols as hydrophilic segments as described in German Offenlegungsschriften No. 2,314,512 (U.S. Pat. No. 3,905,929), 2,551,094, 2,555,534 and 2,651,506.

The polyester diols (A) used according to the present invention have a molecular weight of about 500 to 5000 and include the group of polycarbonates. The polyester diols are reaction products of bi-valent alcohols with bi-valent carboxylic acids. The corresponding polycarboxylic acid anhydrides or polycarboxylic acid esters of lower alcohols or mixtures thereof may also be used instead of the free polycarboxylic acids to produce the polyesters. The polycarboxylic acids may be aliphatic, cycloaliphatic, aromatic and/or heterocyclic in nature and may optionally be substituted by halogen atoms and/or be unsaturated. The following are examples acid, adipic acid, suberic acid, azelaic acid, sebacic acid, phthalic acid, isophthalic acid, phthalic acid anhydride, tetrahydrophthalic acid anhydride, hexahydrophthalic acid anhydride, tetrachlorophthalic acid anhydride, endomethyl tetrachlorophthalic acid anhydride, glutaric acid anhydride, maleic acid, maleic acid anhydride, fumaric acid, dimeric and trimeric fatty acids of oleic acid, optionally in admixture with monomeric fatty acids, terephthalic acid dimethyl esters, terephthalic acid bis-glycol esters. The following are examples of dihydric alcohols which may be used: ethylene glycol, propane diol-(1,2) and -(1,3), butane diol-(1,4), -(1,3) and -(2,3), hexane diol-(1,6), octane diol-(1,8), neopentyl glycol, cyclohexane dimethanol-(1,4-bis-hydroxymethylcyclohexane), 2-methyl-1,3-propane diol, tetraethylene glycol, polyethylene glycols, dipropylene glycol, polypropylene glycols, dibutylene glycols and polybutylene glycols. Polyesters of lactones, such as $\epsilon$caprolactone or hydroxycarboxylic acids such as $\epsilon$-hydroxycaproic acid may also be used.

Hydroxyl group-containing polycarbonates include those known polycarbonates which may be produced by reacting diols such as propane diol-(1,3), butane diol-(1,4) and/or hexane diol-(1,6), diethylene glycol, triethylene glycol or tetraethylene glycol with phosgene or diarylcarbonates such as diphenylcarbonate.

The polyurethane solids material contains about 35 to 55% by weight of polyester and/or polycarbonate (A), preferably about 40 to 50% by weight of (A). The molecular weight is preferably about 1000 to3000.

Ethane diol, propane diol-(1,2) and -(1,3), butane diol-(1,4) and -(1,3), pentane diols, hexane diols or neopentyl glycol may be used as low molecular weight diols (B). The polyurethane solids material contains about 6 to 15% by weight of diols and optionally triols, preferably about 6 to 12% by weight, the quantity of triol being at most 8% of (B). The additional use of trifunctional hydroxyl compounds such as trimethylol propane, hexane triols or glycerol is possible in principle but is a less preferred embodiment of the present process. High urethane group contents necessitate the synthesis of relatively high molecular weight oligourethanes, whose viscosity may reach high values. If trifunctional structural components are used, there is a danger that partially undissolved quantities may be produced which make further processing to usable PUR dispersions almost impossible. The quantity of branched components should thus not exceed 8% of (B).

Chemically-fixed, hydrophilic group-containing mono- and more particularly bi-functional structural components of the type described by way of example in the above literature for the production of aqueous polyurethane dispersions or solutions preferably in the context of the isocyanate addition reaction, include ionic or potential ionic group-containing diisocyanates diamines or dihydroxy compounds or polyethylene oxide unit-containing diisocyanates, monoalcohols or diols. components include in particular the sulphonate group containing aliphatic diols according to DE-OS No. 2,446,440, dimethylol propionic acid, the anionic emulsifiers according to DE-OS No. 2,651,506 and also the monofunctional polyethers described therein Dimethylol propionic acid and the salts thereof such as ammonium salts, dimethylol propionic acid amides and monohydroxy polyalkylene oxides having EO/PO molar contents of about 60:40 to 90:10, more particularly about 85:15 and molecular weights of about 1000 to 3000, preferably about 1500 to 2500 are preferred.

The PUR solids material contains about 1.5 to 15% by weight, preferably about 2 to 7% by weight, of anionic group-containing compounds or non-ionic, polyoxyethylene segment-containing mono- or poly-valent compounds (C).

The polyurethane solids material contains about 25 to 45% by weight, preferably about 30 to 40% by weight, of a bicyclic polyisocyanate having aliphatically-bound NCO groups (D) and about 2 to 9% by weight, preferably about 3 to 7% of aliphatic and/or monocyclic aliphatic polyisocyanates (E). Examples of the cycloaliphatic polyisocyanates (D) include 4,4'-diisocyanatodicyclohexylmethane, 2,2-bis[4-isocyanatocyclohexyl]-propane and 3,3'-dimethyl and other alkylsubstituted 4,4'-diisocyanatodicyclohexylmethanes including any stereo-isomers or stereo-isomer mixtures. Aliphatic diisocyanates (E) include butane diiso-cyanate-1,4, hexane diisocyanate-1,6, 2,2,4-trimethylhexane diisocyanate, undecane diisocyanate-1,11, lysine ester diisocyanate, cyclohexane diisocyanate-1,3 and

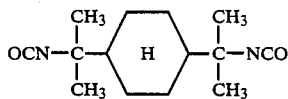

and 1-isocyanato-3-isocyanatomethyl-3,5,5-trimethyl-cyclohexyl diisocyanate (isophorone diisocyanate).

The PUR solids material contains about 0.2 to 4.0% by weight, preferably about 0.8 to 3.5% by weight of polyamines having an average functionality >2, preferably about 2.5 to 3.5 (F). Suitable examples include aliphatic and/or cycloaliphatic triamines and tetramines such as diethylene triamine, triethylene tetramine, dipropylene triamine, tripropylene tetramine, hydrogenated addition products of acrylonitrile to aliphatic or cycloaliphatic diamines, preferably those with addition of an acrylonitrile group such as hexa-methylene-propylene-triamine, tetramethylene-propylenetriamine, isophorone-propylene-triamine, 1,4- or 1,3-cyclohexane-propylene-triamine and mixtures thereof with diamines. Propylene diamine-1,2 and -1,3, ethylene diamine, hexane-1,6-diamine, 2,2-dimethyl-propane-1,3diamine, isophorone diamine, 1,4- or 1,3-cyclohexane diamine, 4,4'-diamino-dicyclomethane, 4,4'-diamino-3,3'-dimethyl-dicyclohexylmethane,

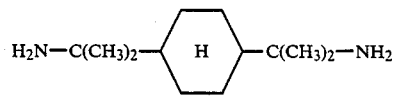

3,3'-dimethyl-4,4'diisocyanato-dicyclohexyl are included as suitable for mixing with the triamines and/or tetramines.

In the production of NCO prepolymers according to known principles of prior art, the reaction constituents are generally used in quantity ratios corresponding to a ratio of isocyanate groups to NCO-reactive groups, preferably of hydroxyl groups, of about 1.05 to 10, preferably about 1.1 to 3.

The individual reaction constituents may generally be added in any order. The hydroxyl compounds may be mixed together and the polyisocyanate may be added thereto or the mixture of hydroxyl compounds may be added to the polyisocyanate component or the individual hydroxyl compounds may be gradually introduced.

The NCO prepolymers are preferably produced in the melt at about 30° to 150° C., preferably about 50 to 120° C. The prepolymers may of course also be produced in the presence of organic solvents. Suitable solvents which may be used in a quantity of up to about 30% by weight, based on solids material, for reducing the viscosity of the high melting prepolymers include acetone, methylethylketone, ethylene glycolmonomethylether acetate, acetic acid ethyl ester, dimethyl formamide, N-methylpyrrolidone, cyclohexanone or tetrahydrofuran.

If diols having carboxyl or carboxylate groups are used as anionic salt groups or as compounds containing groups which are convertible into anionic salt groups, care should be taken to keep the reaction temperature as low as possible so that free carboxyl groups in particular do not substantially react with the isocyanate groups contained in the mixture. Carboxyl groups which have been converted into salt groups are less susceptible to this side reaction, but nevertheless a reaction temperature of 80° C. should generally not be exceeded if possible with these compounds.

It is not advisable to react the prepolymers with the polyamines having a functionality of greater than 2 in the organic phase since insoluble products are generally produced. Instead of this, it is preferred to disperse the dissolved or undissolved NCO prepolymers in water with stirring or by means of devices which produce zones of high shearing force and to stir the amine or amine mixture into the prepolymer dispersion to cause chain lengthening or branching to occur in the heterogeneous mixture.

The solvent may be removed by distillation, if desired, from the resulting polyurethane dispersion. In this method solvents having a boiling point below 100° C. such as acetone or tetrahydrofuran are effectively used to dissolve the prepolymer. High boiling solvents such as dimethylacetamide or N-methylpyrrolidone generally remain in the dispersion and may advantageously be used as coalescing agents to assist in film formation.

The aqueous PUR dispersions contain, for the processing thereof on PVC-surface coatings, alkoxylated dimethyl-polysiloxanes and water-soluble polyethylene oxide derivatives in a quantity of about 0.2 to 15% by weight, preferably about 1 to 7% by weight, based on the total solids. Alkoxylated, preferably ethoxylated and/or propoxylated, dimethyl-polysiloxanes include alkoxylated polysiloxanes having an EO/PO ratio of e.g. 70:30. The molar sum of the alkoxy groups, preferably EO/PO groups is about 8 to 150, preferably about 40 to 150 and most preferably about 65 to 150. In addition, the weight of the alkoxy groups, preferably EO/PO groups, is equal to or greater than the weight of the dimethyl-polysiloxane segment. Water-soluble polyethylene oxide derivatives having ethylene oxide units (optionally having hydroxyl and/or carboxyl end groups) include alkoxylated alkyl phenols, specifically oxethylated nonylphenol (degree of oxethylation of about 10) and/or acetylated polyethylene oxides having a molecular weight of about 600 to 10,000, at a concentration of about 25 to 35% in water. Flow agents, thickeners and other auxiliaries such as stabilizers of all types used in coating technology may optionally be added to the present coating compositions. Of particular note in this instance are crosslinking agents such as formaldehyde/melamine or formaldehyde/urea resins: polyisocyanates such as biurets or trimers or polyol-modified polyisocyanates of isophorone diisocyanate or dicyclohexylmethane diisocyanates or hexane disssocyanate-1,6, which are blocked with butanone oxime, malonic acid diethyl ester, acetoacetic acid ethyl ester, etc.: and also polyaziridines that is, reaction products of polyisocyanates and ethylene imine or propylene imine or addition products of these aziridines to acrylic or methacrylic esters of polyalcohols. These agents may be present in quantities of up to about 20% by weight, based on total solids.

The aqueous preparations are applied to coated surfaces, more particularly PVC surfaces by doctoring, screening, pressing, spraying, etc. The quantities applied are generally very low for finishes such as about 2 to 20 g/m:, preferably about 5 to 10 g/m: The coatings are dried at about 70 to 170° C., more particularly about 90° to 130° C.

The invention is further illustrated, but is not intended to be limited by the following examples in which all parts and percentages are by weight unless otherwise specified.

EXAMPLES

EXAMPLE 1

(A) Production of the PUR dispersion Mixture (1) 340 g polyadipate from hexane diol-1,6/neopentyl glycol (molar ratio 65:35, OH number 56)
(2) 63.0 g butane diol-1,4 (3) 17.4 g di-methylol propionic acid
(4) 13.1 g triethylamine
(5) 424 g N-methylpyrrolidone
(6) 230.6 g 4,4'-dicyclohexylmethane diiso-cyanate
(7) 37.0 g hexane diisocyanate
(8) 831 deionized water
(9) 5.7 g diethylene triamine (10) 57 g deionized water.

A mixture of (1)-(4) was dissolved in N-methylpyrrolidone (5) and reacted at 80° C. with the mixtures of the two diisocyanates (6) and (7). After the addition of deionized water (8) the mixture was reacted in aqueous solution with the amine (9). 2019 g of PUR dispersion having a solids content of 35% was obtained which contained 21% of N-methylpyrrolidone. B) Finishing preparation
920 g PUR dispersion according to (A) 4 g anti-foaming agent (Antispumin DI, available from Stockhausen, Duesseldorf,
D 4000)
10 g acetylated polyethylene oxide having a molecular weight of about 10,000, 30% in water
5 g oxyalkylated polysiloxane (EO/PO-content =70:30), 100% water-soluble 55 g polyacrylic acid, 25% in water 6 g conc. ammonia.

(C) Finishing

Using a 40-mesh roller the finishing preparation according to (B) was used to print PVC-coated articles. The articles were dried in 2 min. at 120° C., application (dry weight) about 5 g/m:. The finishing preparation provided a good contrasted print: adhesion was excellent when both dry and wet.

5% of matting agent OK 412 (Degussa) was added to the finishing preparation to influence the grip (D) Preparation for film prints 500 g PUR dispersion according to (A)
10 g anti-foaming agent as in 1(B)
30 g urea
20 g rheology modifier (emulsifier B, by Bayer)
10 g rheology modifier (ACRACONE 0, by Bayer)
00 g colored paste (EUDERM - bordo C, by Bayer)
5 g oxylated polysiloxane according to (B) 325 g water.

The prints were dried at 130° C. for 5 min.

The print adhered very well to PVC films or PVC-coated substrates both in the dry and wet state. The alcohol-resistance (to 50% aqueous ethanol) 0 brush-washings and resistance to abrasion tests showed a good level of fastness both when dry and (A) Production of the PUR dispersion Mixture 420 g hexane diol-1,6-adipate (OH number 134)
58.5 g butane diol-1,4
4.5 g trimethylol propane
40.2 g dimethylol propionic acid
30.0 g triethylamine
30 g N-methylpyrrolidone
67.0 g hexane diisocyanate
66.0 g 4,4'-dicyclohexylmethane diisocyanate
16.0 g trimer of hexane diisocyanate, NCO content about 10%, blocked with butanone oxime
19.0 g dipropylene triamine
1400 g deionized water.

The PUR dispersion was produced as described in Example 1(A).

The 40% PUR dispersion contained about 5% N-methylpyrrolidone.

(B) Finishing preparation 885 g PUR dispersion as described above
27 g oxalkylated polysiloxane (EO/PO content =70:30, 100% water-soluble)
88 g oxalkylated nonylphenol, degree of oxalkylation=10.

(C) Finishing

The finishing preparation was doctored onto a PVC-coated article as a top lacquer and was dried at about 80° to 130° C., the application being 8 g/m:. The top lacquer had good dry and wet adhesion and good scuff resistance.

The alcohol-resistance (to 50% aqueous ethanol)
(A) Production of the PUR dispersion
500 g hexane diol-1,6-polycarbonate (O) number 56)
148 g hexane diol-1,6
16.7 g dimethylol propionic acid
12.6 g triethylamine
600 g N-methylpyrrolidone
47 g 4,4'-dicyclohexylmethane diisocyanate
44.4 g isophorone diisocyanate
20.6 g diethylene triamine
4.5 g ethylene diamine 1850 g deionized water.

The PUR dispersion was produced as in Example 1(A).

The 30% dispersion contained about 16% N-methyl-pyrrolidone. cl (B) Finishing preparation
880 g PUR dispersion according to 3(A)
30 g oxalkylated polysiloxane (EO/PO content =70:30, 100% water-soluble)
90 g oxalkylated nonylphenol, degree of oxalkylation 10.

Finishing

The finishing preparation was applied to a PVC-coated article using a spiral doctoring blade, was dried at 80° to 130° C., and was applied (dry weight) at about 5 g/m:. The finish was distinguished by very good dry and wet adhesion. The scuff resistance (scrub test) was very good.

The alcohol-resistance (to 50% aqueous ethanol)

Example 4

(A) Production of the PUR dispersion

Mixture 500 g butane diol-1,4-polyadipate (OH number 56)
93.0 g ethylene glycol
13.4 g dimethylol propionic acid
134 g triethylamine
10.0 g monohydroxy-polyalkylene oxide, (EO/PO =85:15)
700 g N-methylpyrrolidone
497 g 4,4'-dicyclohexylmethane diisocyanate
76.0 g hexane diisocyanate-1,6
26.2 g dipropylene triamine
17.0 g isophorone diamine
1630 g deionized water.

The PUR dispersion was produced as in Example 1(A).

The 35% dispersion contained about 20% N-methyl-pyrrolidone.

(B) Finishing preparation 975 g PUR dispersion according to (A)
5 g anti-foaming agent (Respumit 3300, by Bayer)
15 g acetylated polyethylene oxide having a molecular weight of about 10,000, 30% in water
5 g oxalkylated polysiloxane, as in Example 1(B).

(C) Finishing

The finishing preparation was applied to a PVC-coated article and to a PUR-coated article as described in Example 3(C). On both articles the finish was distinguished by excellent dry and wet adhesion. The alcohol-resistance (to 50% aqueous ethanol) was good.

Comparative Examples

Production of the PUR dispersions Al)

554 g hexane diol-1,6-polyadipate (OH number 134)
23.0 g trimethylol propane
53.0 g dimethylol propionic acid
33.0 g trimethylamine
200 g 1,6-hexane diisocyanate
310 g 4,4'-dicyclohexylmethane diisocyanate
69.5 g acetone azine
1860 g deionized water. Method: (according to DE-A 2,811,148). The trimethylol propane, the dimethylol propionic acid and the triethylamine were mixed into the hexane diol-polyadipate which had been desalinated at ° C and the diisocyanates were added at 60° C. The mixture was stirred at 80° C until a constant NCO value was obtained. The mixture was then left to cool to 50° C. and the acetone azine was stirred into the moderately viscous NCO prepolymer melt. The temperature dropped slightly and the viscosity decreased. The water was then added with good stirring and the mixture was stirred for 2 hours. The resulting dispersion had a solids content of 40% (Example 1 of DE-OS 3,134,161).

544 g hexane diol-1,6-adipate (OH number 134)
53.0 g dimethylol propionic acid
33.0 g triethylamine
490 g N-methylpyrrolidone
158 g 1,6-hexane diisocyanate
310 g 4,4'-dicyclohexylmethane diisocyanate
69.5 g acetone azine
1700 g deionized water.

The components were reacted to produce the dispersions as in Al).

The dispersion had a solids content of 35% and contained 14.5% N-methylpyrrolidone.

A3)

485 g hexane diol-1,6-polyadipate (OH number 134)
20 g trimethylol propane 85 g propoxylated adduct of 2-butene diol 1,4 and NaHS03 (molecular weight 425)
365 g 4,4'-dicyclohexylmethane diisocyanate
67 g 1,6-hexane diisocyanate
107 g N-methylpyrrolidone
500 g deionized water. Method: a. Al), c.f. DE-AS 2,811,148.

The resulting dispersion had a solids content of 40% (Example 2 of DE-OS 3,134,161).

Finishing preparations were produced from the PUR dispersions Al), A2), A3) for purposes of comparison in accordance with Example 1 (B). PVC coated articles were finished according to 1 (C). Dry and wet adhesion were assessed as well as the resistance to 50% aqueous ethyl alcohol.

| | Dry Adhesion | Wet Adhession | Resistance to 50% aqueous ethyl alcohol |
|---|---|---|---|
| Example 1C | ++ | ++ | + |
| Example 2C | ++ | ++ | + |
| Example 3C | ++ | ++ | + |
| Example 4C | ++ | ++ | + |
| Comparison A 1/C | + | − | − |
| Comparison A 2/C | + | − | − |
| Comparison A 3/C | + | − | − |

++ very good
+ good
o satisfactory
− unsatisfactory

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous coating composition based on polyurethane-ureas and having a solids content of about 10 to 70%, said polyurethane-ureas comprising the reaction product of (A) about 35 to 55% by weight of a polyester diol having a molecular weight of about 500 to 5000,
(B) about 6 to 15% by weight of a low molecular weight diol having from 2 to 10 carbon atoms
(C) about 1.5 to 15% by weight of an anionic group-containing and/or a non-ionic hydrophilic polyoxythylene unit-containing mono- or poly-functional compound with the proviso that any compound which satisfies the requirements of component (C) by containing an anionic group or a non-ionic hydrophilic polyoxythylene unit is included as component (C) and not as a part of components (A), (B), (D), (E), or (F),
(D) about 25 to 45% by weight of a diisocyanate corresponding to the formula

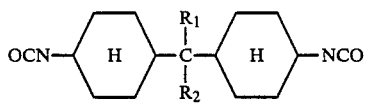

wherein $R_1$, $R_2$ and $R_3$ may be the same or different and represent hydrogen or a straight-chain or branched aliphatic hydrocarbon radical having from 1 to 4 carbon atoms,
(E) about 2 to 9% by weight of an aliphatic diisocyanate or cycloaliphatic diisocyanate other than (D) and
(F) about 0.2 to 4.0% by weight of a polyamine having an average functionally >2 and wherein the aqueous composition additionally contains in physical admixture an alkoxylated dimethyl-polysiloxane having 40 to 150 alkoxy groups and a water-soluble polythylene oxide derivative.

2. The aqueous coating composition of claim 1 wherein in said aqueous composition contains about 15 to 65% of solids based on
(I) about 65 to 99.8% by polyurethane-ureas,
(II) about 0.1 to 5% by weight of said alkoxylated dimethyl-polysiloxane and
(III) about 0.1 to 10% by weight of a water soluble polyethylene oxide derivative,
wherein the sum of (I) +(11) +(III) is >80%.

3. The aqueous coating composition of claim 1 wherein said aqueous composition contains about 20 to 45% solids based on
(I) about 73 to 99% by weight of said polyurethane-ureas,
(II) about 0.5 to 2% by weight of said alkoxylated dimethyl-polysiloxane and
(III) about 0.5 to 5% by weight of a water-soluble polyethylene oxide derivative wherein the sum of (I) +(II)+(II)+is to >80%.

4. The aqueous coating composition of claim 1 wherein said alkoxylated dimethyl-polysiloxane is ethoxylated and/or propoxylated.

5. The aqueous coating composition of claim 2 wherein said alkoxylated dimethyl-polysiloxane is ethoxylated and/or propoxylated.

6. The aqueous coating composition of claim 1 wherein said water-soluble polyethylene oxide derivative is an alkoxylated alkylphenol.

7. The aqueous coating composition of claim 2 wherein said water-soluble polyethylene oxide derivative is an alkoxylated alkylphenol.

8. The aqueous coating composition of claim 4 wherein said water-soluble polyethylene oxide derivative is an alkoxylated alkylphenol.

9. The aqueous coating composition of claim 5 wherein said water-soluble polyethylene oxide derivative is an alkoxylated alkylphenol.

10. A process for the production of a top coat which comprises coating a surface coating with the aqueous coating composition of claim 1 and curing said coating at a temperature of about 70°–170° C.

11. The process of claim 10 wherein said surface coating is a PVC or polyurethane coating and said aqueous coating composition is cured at a temperature of about 90°–130° C.

12. The aqueous coating composition of claim 1 wherein component (C) is based on about 1 5 to 15 percent by weight of an anionic group-containing mono- or poly-functional compound and/or a non-ionic hydrophilic polyoxethylene unit-containing mono-functional compound.

13. The aqueous coating composition of claim 1 wherein said reaction product additionally comprises up to 8%, based on the weight of component (B), of a triol having 2 to 10 carbon atoms.

14. An aqueous coating composition based on polyurethane-ureas and having a solids content of about 10 to 70%, said polyurethane-ureas comprising the reaction product of
(A) about 35 to 55% by weight of a polyester diol having a molecular weight of about 500 to 5000,
(B) about 6 to 15% by weight of a low molecular weight diol having from 2 to 10 carbon atoms,
(C) about 1.5 to 15% by weight of an anionic group-containing and/or a non-ionic hydrophilic polyoxyethlene unit-containing mono- or poly-functional compound with the proviso that any compound which satisfies the requirements of component (C) by containing an anionic group or a non-ionic hydrophilic polyoxyethylene unit is included as component (C) and not as a part of components (A), (B), (D), (E), or (F),
(D) about 25 to 45% by weight of a diisocyanate corresponding to the formula

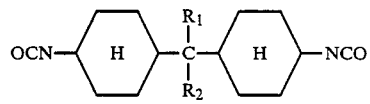

wherein $R_1$, $R_2$ and $R_3$ may be the same or different and represent hydrogen or a straight-chain or branched aliphatic hydrocarbon radical having from 1 to 4 carbon atoms,
(E) about 2 to 9% by weight of an aliphatic diisocyanate or cycloaliphatic diisocyanate other than (D) and
(F) about 0.2 to 4.0% by weight of a polyamine having an average functionality >2 and wherein the aqueous composition additionally contains in physical admixture an alkoxylated dimethyl-polysiloxane having 65 to 150 alkoxy groups and a water-soluble polyethylene oxide derivative and wherein the weight of the alkoxy groups of said alkoxylated dimethyl-polysiloxane is equal to or greater than the weight of the dimethy-polysiloxane segment.

15. The aqueous coating composition of claim 14 wherein component (C) is based on about 1.5 to 15 percent by weight of an anionic group-containing mono- or poly-functional compound and/or a non-ionic hydrophilic polyoxyethlene unit-containing mono-functional compound.

* * * * *